(12) United States Patent
Lam et al.

(10) Patent No.: US 11,272,670 B2
(45) Date of Patent: Mar. 15, 2022

(54) POWER TOOL AND A DRIVING MECHANISM FOR USE IN A POWER TOOL

(71) Applicant: TTI (MACAO COMMERCIAL OFFSHORE) LIMITED

(72) Inventors: Chin Hung Ricky Lam, Hk (CN); Yu Long Wang, Guangdong (CN); Jeff Nesom, Guangdong (CN)

(73) Assignee: Techtronic Cordless GP, Anderson, SC (US)

( * ) Notice: Subject to any disclaimer, the term of this patent is extended or adjusted under 35 U.S.C. 154(b) by 46 days.

(21) Appl. No.: 16/612,007

(22) PCT Filed: May 9, 2017

(86) PCT No.: PCT/CN2017/083573
§ 371 (c)(1),
(2) Date: Nov. 13, 2019

(87) PCT Pub. No.: WO2018/205126
PCT Pub. Date: Nov. 15, 2018

(65) Prior Publication Data
US 2021/0076572 A1    Mar. 18, 2021

(51) Int. Cl.
*A01G 3/037* (2006.01)
*A01G 3/033* (2006.01)
*A01G 3/025* (2006.01)

(52) U.S. Cl.
CPC ........... *A01G 3/037* (2013.01); *A01G 3/0335* (2013.01); *A01G 3/0255* (2013.01)

(58) Field of Classification Search
CPC ...... A01G 3/037; A01G 3/0335; A01G 3/033; A01G 3/0255
See application file for complete search history.

(56) References Cited

U.S. PATENT DOCUMENTS

| | | | |
|---|---|---|---|
| 8,122,607 B2* | 2/2012 | Maniwa | B26B 15/00 30/228 |
| 2008/0189870 A1* | 8/2008 | Dayton | B08B 1/04 7/167 |

(Continued)

FOREIGN PATENT DOCUMENTS

| | | |
|---|---|---|
| CN | 105340593 A | 2/2016 |
| CN | 205196405 U | 5/2016 |

(Continued)

OTHER PUBLICATIONS

Examination Report for corresponding AU Patent Application No. AU2017413578; dated Oct. 1, 2020; (2 pages).

(Continued)

*Primary Examiner* — Jennifer S Matthews
(74) *Attorney, Agent, or Firm* — Dority & Manning, P.A.

(57) ABSTRACT

A driving mechanism for use in a power tool and a power tool comprising the driving mechanism in connection with a motor and an operation member. The driving mechanism includes a sliding member arranged to drive the operation member, the sliding member is arranged to move between a first sliding position and a second sliding position along a longitudinal axis during an operation of the power tool so as to drive the operation member to move between a first operation position and a second operation position respectively.

17 Claims, 17 Drawing Sheets

(56) References Cited

U.S. PATENT DOCUMENTS

| | | |
|---|---|---|
| 2010/0269355 A1 | 10/2010 | Yang |
| 2011/0258859 A1 * | 10/2011 | Schofield ............... A01G 3/037 30/228 |
| 2012/0011729 A1 | 1/2012 | Kim |
| 2012/0167397 A1 * | 7/2012 | Huang ................. A01G 3/0255 30/249 |

FOREIGN PATENT DOCUMENTS

| | | | |
|---|---|---|---|
| CN | CN205511051 U | 8/2016 | |
| CN | 105917984 A | 9/2016 | |
| CN | 106305166 A | 1/2017 | |
| EP | 0291431 A1 * | 11/1988 | ............. A01G 3/037 |
| EP | 2045050 A1 | 4/2009 | |
| EP | 2979538 A1 * | 2/2016 | ........... A01G 3/0255 |
| EP | 3103598 A1 * | 12/2016 | |
| EP | 3127665 A1 * | 2/2017 | |
| FR | 2611549 A3 * | 9/1988 | ........... B23D 29/002 |
| JP | H1052167 A | 2/1998 | |
| KR | 20100032290 A | 3/2010 | |
| WO | WO2008023705 A1 | 2/2008 | |
| WO | WO-2017129235 A1 * | 8/2017 | ........... A01G 3/0255 |
| WO | WO-2018145846 A1 * | 8/2018 | ........... A01G 3/0255 |

OTHER PUBLICATIONS

Supplementary Search Report for corresponding EP Patent Application No. EP17908810; dated Aug. 11, 2020; (3 pages).
TTI (Macao Commercial Offshore) Limited; International Patent Application No. PCT/CN2017/083573; International Search Report; dated Feb. 23, 2018: (2 pages).

* cited by examiner

POWER TOOL AND A DRIVING MECHANISM FOR USE IN A POWER TOOL

This application is a National Stage Patent Application of PCT/CN2017/083573, filed on May 9, 2017, the disclosure of which is incorporated by reference herein in its entirety.

TECHNICAL FIELD

The present invention relates to a power tool and a driving mechanism for use in a power tool, and particularly, although not exclusively, to an electric tree lopper.

BACKGROUND

Maintenance of trees and bushes usually involve cutting and trimming of the branches and twigs from time to time. To facilitate the maintenance work, a user may perform these trimming operations with the help of cutting tools such as a lopper. Although the some of the tools may be specially design to be manually operated, these heavy duty tools may cause fatigue to the user after prolonged operations.

SUMMARY OF THE INVENTION

In accordance with a first aspect of the present invention, there is provided a driving mechanism for use in a power tool, comprising a sliding member arranged to drive an operation member of the power tool, wherein the sliding member is arranged to move between a first sliding position and a second sliding position along a longitudinal axis during an operation of the power tool so as to drive the operation member to move between a first operation position and a second operation position respectively.

In an embodiment of the first aspect, the sliding member is driven by a motor.

In an embodiment of the first aspect, the driving mechanism further comprises a screw and a nut rotatably connected to the screw, wherein the screw is arranged to rotate with respect to a rotational axis parallel to the longitudinal axis so as to drive the nut to move along the longitudinal axis.

In an embodiment of the first aspect, the sliding member is the nut.

In an embodiment of the first aspect, the sliding member is fixedly connected to the nut.

In an embodiment of the first aspect, the screw is driven by a motor.

In an embodiment of the first aspect, the driving mechanism further comprises at least one intermediate connecting member arranged to connect the sliding member to the operation member.

In an embodiment of the first aspect, the at least one intermediate connecting member include at least one of a string, a rope, a strand, a chain, a belt and a cable.

In an embodiment of the first aspect, the driving mechanism further comprises at least one pulley arranged to cooperate with the at least one intermediate connecting member.

In an embodiment of the first aspect, the at least one pulley is arranged to increase, a reduction ratio of the driving mechanism.

In an embodiment of the first aspect, the power tool includes a telescopic structure, and wherein the at least one pulley is arranged to maintain an operational tension in the intermediate connecting member when the telescopic structure extends or retracts.

In an embodiment of the first aspect, the driving mechanism further comprises a resilient member arranged to restore the operation member from the first operation position to the second operation position.

In an embodiment of the first aspect, the operation member is arranged to move to the second operation position upon an actuation of the power tool is released.

In an embodiment of the first aspect, the driving mechanism further comprises at least one position sensor arranged to detect the sliding member positioned at the first sliding position and/or the second sliding position.

In an embodiment of the first aspect, the at least one position sensor is at least one electrical switch.

In an embodiment of the first aspect, the driving mechanism further comprises an adjustment mechanism arranged to selectively fix the operation member at a plurality of angles with respect to the longitudinal axis.

In an embodiment of the first aspect, the operation member includes a movable blade arranged to move between an open position and a close position.

In an embodiment of the first aspect, the first operation position and the second position are the close position and the open position respectively.

In an embodiment of the first aspect, the power tool is a pruner or a topper.

In accordance with a second aspect of the present invention, there is provided a power tool comprising a driving mechanism in connection with a motor and an operation member, wherein the driving mechanism includes a sliding member arranged to drive the operation member, the sliding member is arranged to move between a first sliding position and a second sliding position along a longitudinal axis during an operation of the power tool so as to drive the operation member to move between a first operation position and a second operation position respectively.

In an embodiment of the second aspect, the sliding member is driven by the motor.

In an embodiment of the second aspect, the power tool further comprises a screw and a nut rotatably connected to the screw, wherein the screw is arranged to rotate with respect to a rotational axis parallel to the longitudinal axis so as to drive the nut to move along the longitudinal axis.

In an embodiment of the second aspect, the sliding member is the nut.

In an embodiment of the second aspect, the sliding member is fixedly connected to the nut.

In an embodiment of the second aspect, the screw is driven by the motor.

In an embodiment of the second aspect, the power tool further comprises at least one intermediate connecting member arranged to connect the sliding member to the operation member.

In an embodiment of the second aspect, the at least one intermediate connecting member include at least one of a string, a rope, a strand, a chain, a belt and a cable.

In an embodiment of the second aspect, the power tool further comprises at least one pulley arranged to cooperate with the at least one intermediate connecting member.

In an embodiment of the second aspect, the at east one pulley is arranged to increase a reduction ratio of the driving mechanism.

In an embodiment of the second aspect, the power tool includes a telescopic structure arranged to extend and retract so as to respectively move the operation member away from and towards the motor along the longitudinal axis.

In an embodiment of the second aspect, the at least one pulley is arranged to maintain an operational tension of the intermediate connecting member when the telescopic structure extends or retracts.

In an embodiment of the second aspect, the driving mechanism further comprises a resilient member arranged to restore the operation member from the first operation position to the second operation position.

In an embodiment of the second aspect, the operation member is arranged to move to the second operation position upon an actuation of the power tool is released.

In an embodiment of the second aspect, the power tool further comprises at least one position sensor arranged to detect the sliding member positioned at the first sliding position and/or the second sliding position.

In an embodiment of the second aspect, the at least one position sensor is at least one electrical switch.

In an embodiment of the second aspect, the power tool further comprises an adjustment mechanism arranged to selectively fix the operation member at a plurality of angles with respect to the longitudinal axis.

In an embodiment of the second aspect, the operation member includes a movable blade arranged to move between an open position and a close position.

In an embodiment of the second aspect, the first operation position and the second position are the close position and the open position respectively.

In an embodiment of the second aspect, the power tool is a pruner or a lopper.

In an embodiment of the second aspect, the power tool is battery-powered.

BRIEF DESCRIPTION OF THE DRAWINGS

Embodiments of the present invention will now be described, by way of example, with reference to the accompanying drawings in which.

DESCRIPTION OF THE PREFERRED EMBODIMENT

Figure 1:
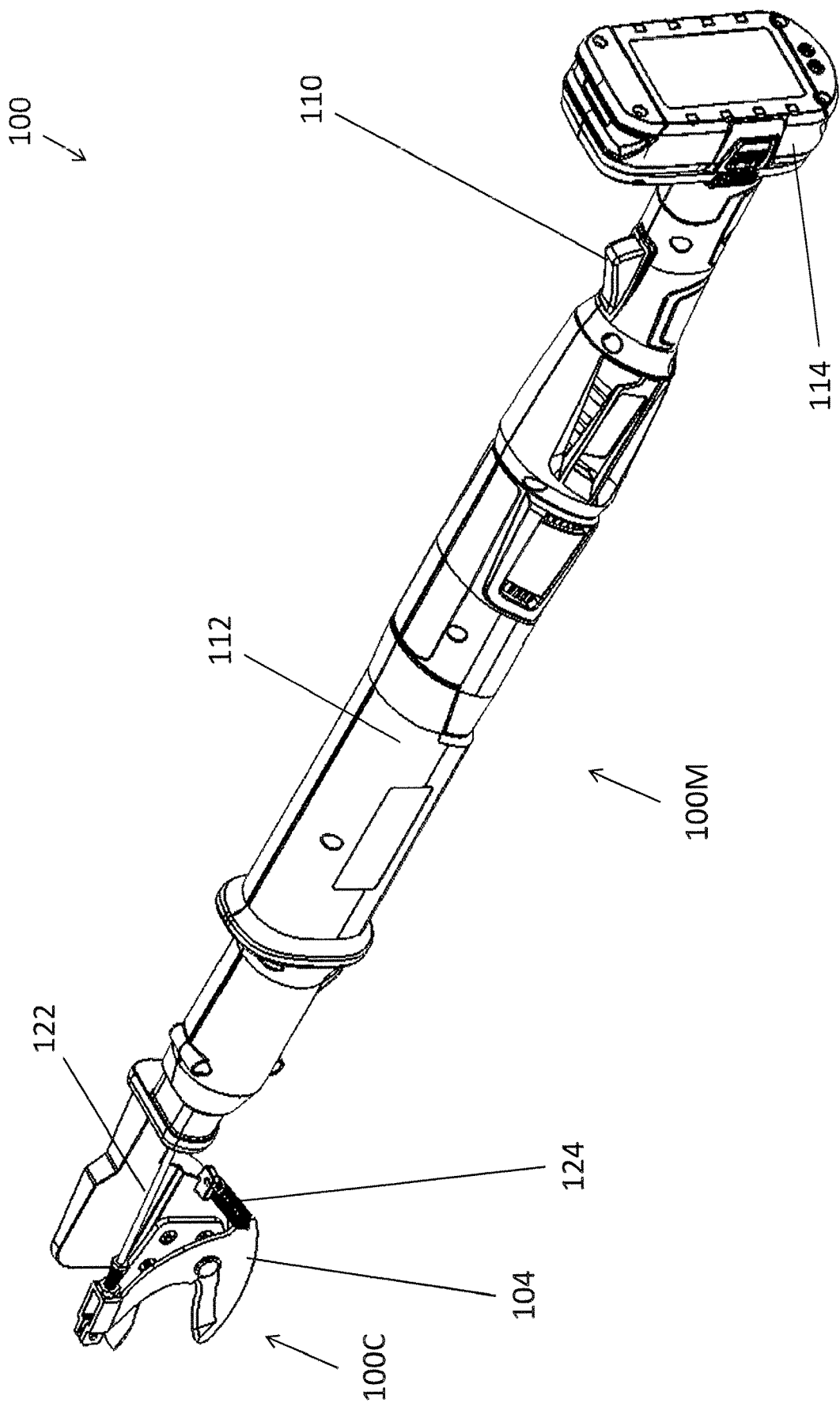
FIG. 1 is a perspective view of a power tool in accordance with one embodiment of the present invention.
Figure 2:
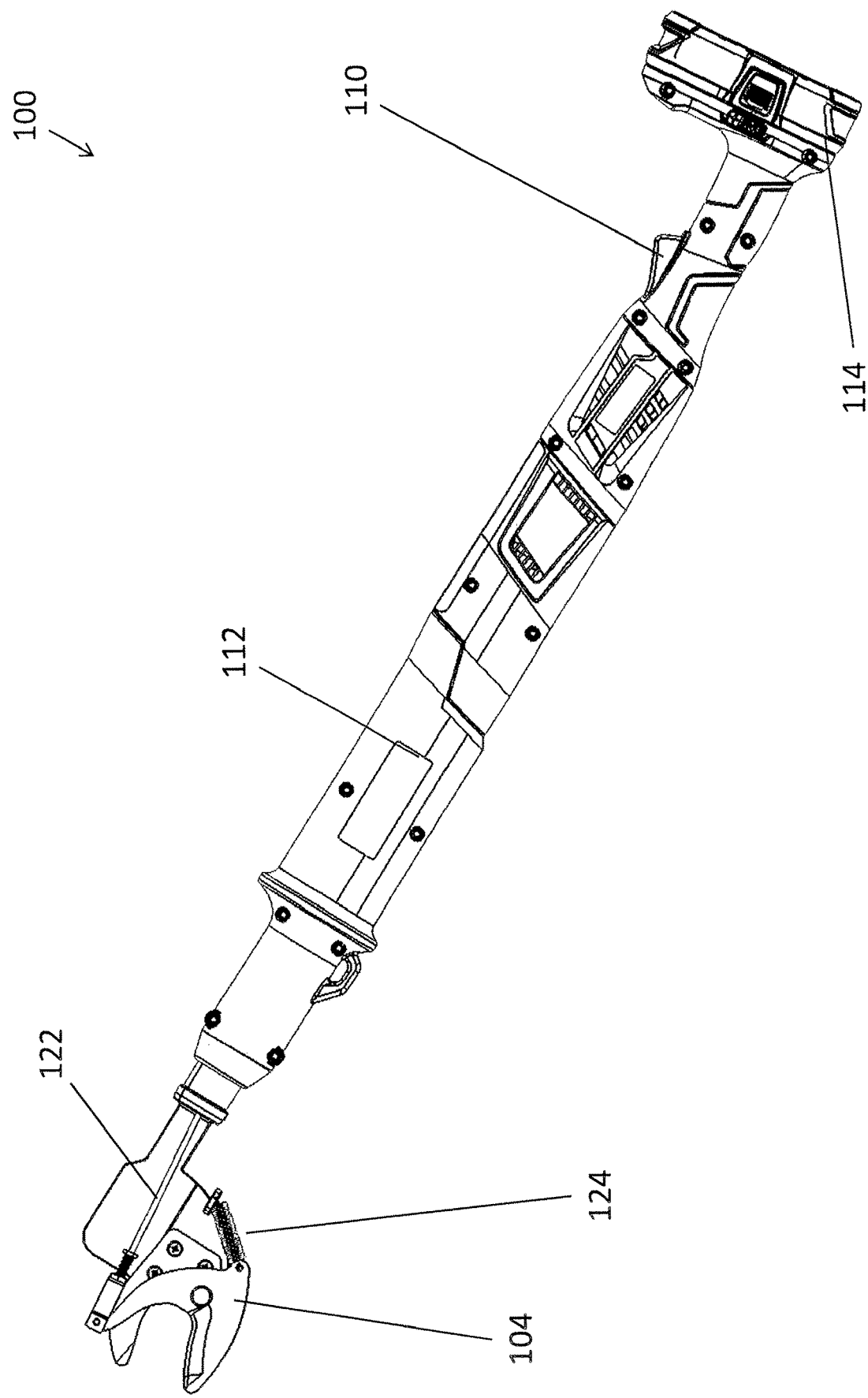
FIG. 2 is a side view of the power tool of FIG. 1.
Figure 3:
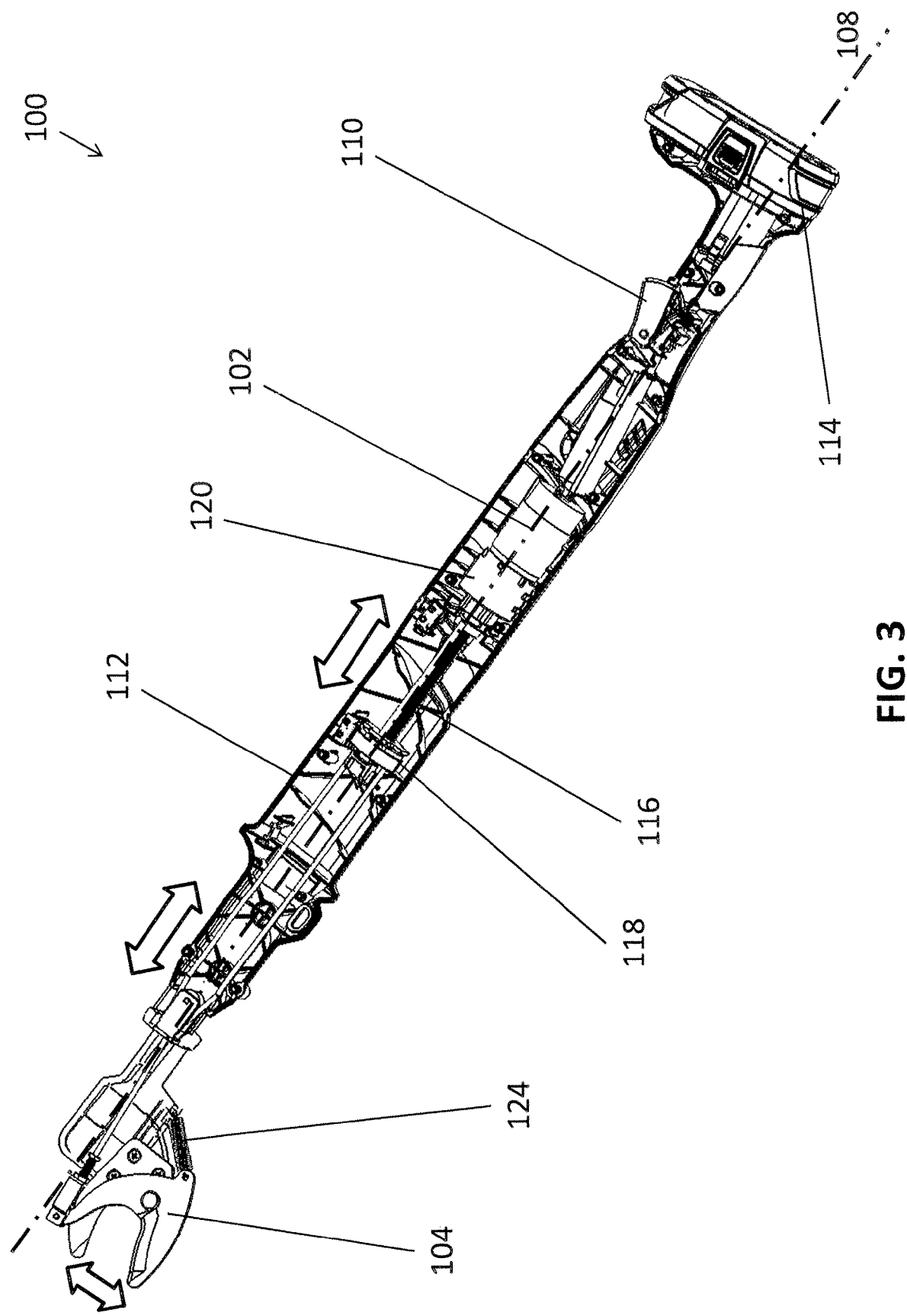
FIG. 3 is a side view of the power tool of FIG. 2, wherein the internal components of the main body of the power tool is exposed.

With reference to FIGS. 1 to 3, there is provided an example embodiment of a power tool 100 comprising a driving mechanism in connection with a motor 102 and an operation member 104, wherein the driving mechanism includes a sliding member 106 arranged to drive the operation member 104, the sliding member 106 is arranged to move between a first sliding position 106A and a second sliding position 106B along a longitudinal axis 108 during an operation of the power tool 100 so as to drive the operation member 104 to move between a first operation position 104A and a second operation position 104B respectively.

In this embodiment, the power tool 100 may be used as a pruner or a lopper. The power tool 100 has an operation member which includes a movable blade 104 for cutting elongated objects such as branches and twigs. In addition, the lopper may be battery-powered. When in use, a user may actuate the lopper 100 by pressing a switch 110 provided on the housing 112 of the power tool 100 to control the movable blade 104. The blade 104 may be selectively opened and closed so as to cut the objects.

Preferably, the battery assembly 114 may be installed at a proximal end of the power tool 100 in which the handle or a gripping portion of the main body 100M may also be provided at such end. For example, the battery assembly 114 may be installed to the power tool 100 by inserting a portion of the battery assembly 114 within a cavity within the gripping portion. On the other hand, the blade 104 or the cutting head 100C is provided at the distal end of the power tool 100. This may be advantageous in that the center of gravity of the power tool 100 is kept closed to the user when in used, as the battery assembly usually contributes a relatively large portion of weight of the entire power tool 100, therefore the power tool 100 is suitable for handheld operations.

The power tool 100 may be provided with an electric motor 102 arranged to drive the movable blade or the operation member 104 through a driving mechanism. Preferably, the driving mechanism is arranged to transmit the mechanical movements and forces from the motor 102 to the blade 104. In addition, the power tool 100 may be provided with a housing 112 arranged to accommodate the motor 102 and the driving mechanism. Referring to FIGS. 1 and 2, the housing 112 is preferably arranged between the battery 114 and the operation member 104. A power switch 110 may be provided on the housing 112 around the gripping portion for a user to activate the power tool 100 by pressing the power switch 110.

With reference to FIG. 3, there is provided an example embodiment of the driving mechanism which comprises a sliding member 106 for driving the operation member 104 of the power tool 100. The driving mechanism further comprises a screw 116 and a nut 118 rotatably connected to the screw 116, and the sliding member 106 is fixedly connected to the nut 118. Preferably, the screw 116 is driven by a motor 102 and therefore the connected sliding member 106 is also driven by the motor 102.

Alternatively, the screw 116 and nut 118 combination may be replaced by different substituted mechanical structures, which may include a bolt, a stud or a threaded pin, etc. In addition, the screw 116 may be driven by the motor 102 via a gear box 120 or a transmission mechanism.

Figure 4A:
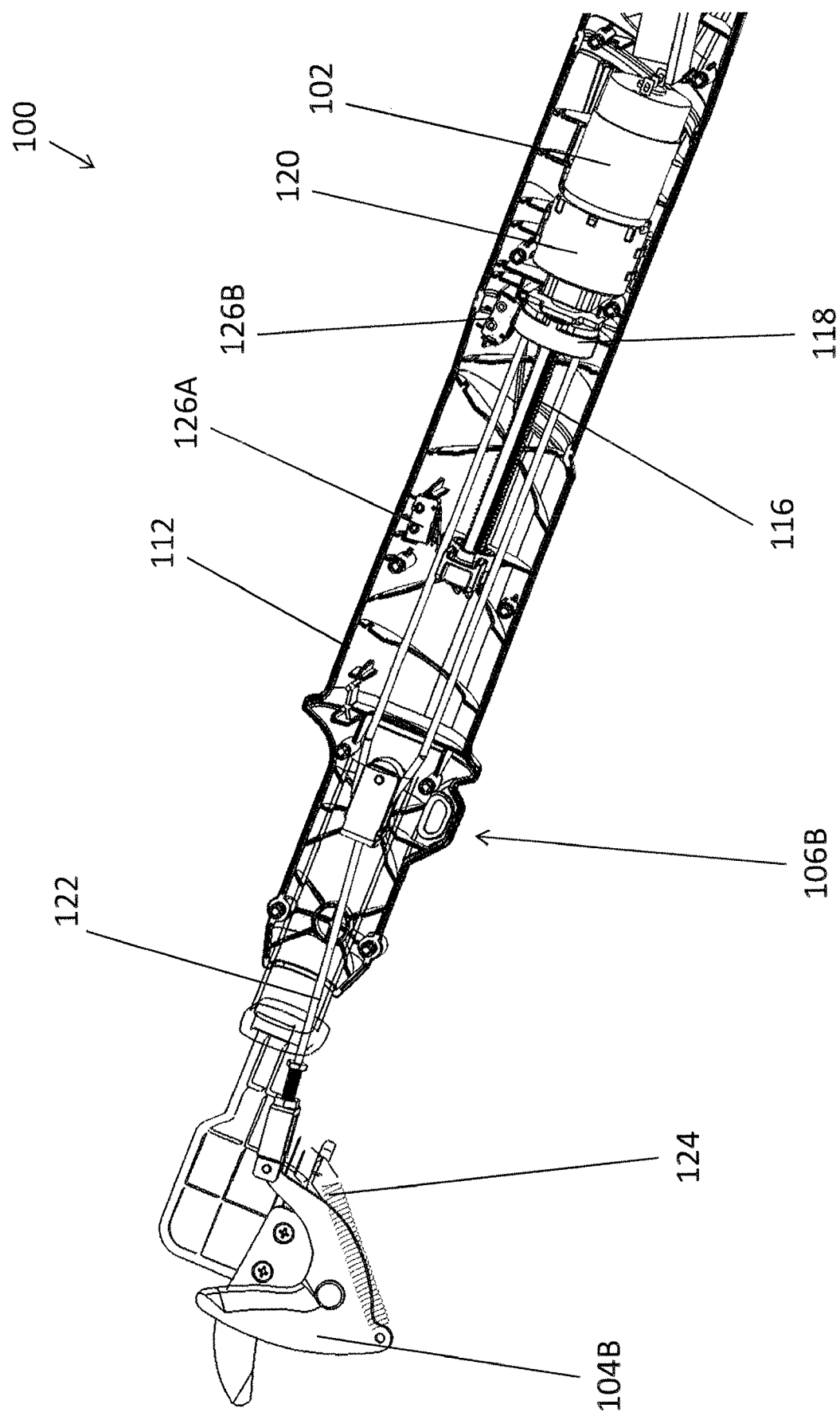
FIGS. 4A and 4B are side views of the power tool of FIG. 1, wherein the movable blade is moved to a close and an open position respectively.
Figure 4B:
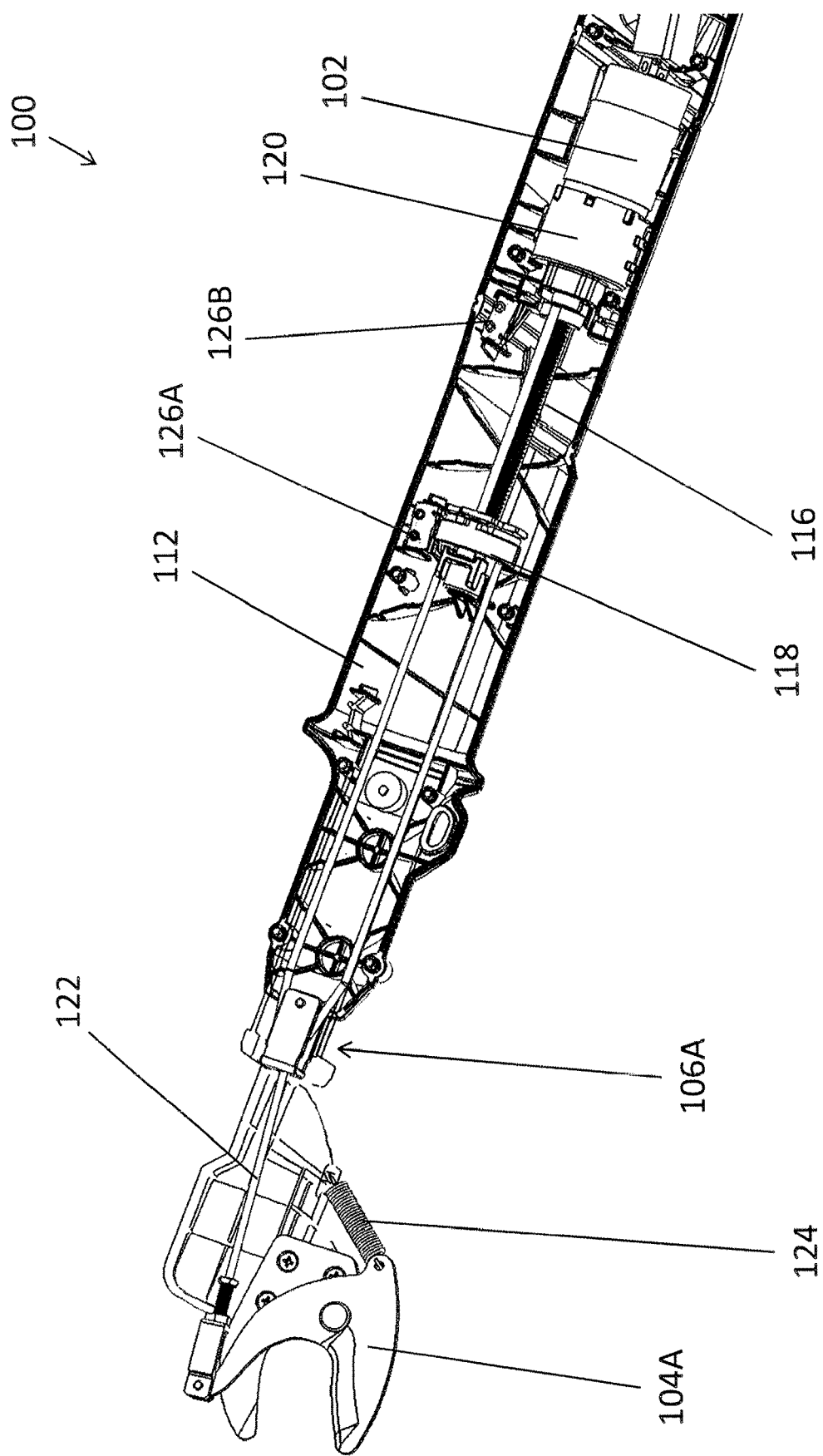

With reference to FIGS. 4A and 4B, the motor 102 is arranged to drive the sliding member 106 and thereby the operation member 104, preferably by driving the screw 116 connected or engaged to the motor 102. By moving the sliding member 106 between first and second sliding positions 106A/106B, the operation member 104 driven by the sliding member 106 moves between first and second operation positions 104A/104B, which respectively correspond to an open position and the close position of the movable blade 104.

The screw 116 is configured to rotate with respect to a rotational axis so as to drive the nut 118 to move along the rotational axis. The nut 118 is fixedly connected to the sliding member 106, therefore the nut 118 forces the sliding member 106 to move in the similar direction, i.e. along the rotational axis of the screw 116. In this example embodiment, the rotational axis and the longitudinal axis 108 of the power tool 100 share the same axis. In some alternative embodiments, the sliding member 106 may be arranged to move along a longitudinal axis 108 which is parallel to the rotational axis of the screw 116 but not the same axis as such rotational axis.

Preferably, the driving mechanism comprises at least one intermediate connecting member 122 arranged to connect the sliding member 106 to the operation member 104. This may include a string, a rope, a strand, a chain, a belt, a cable and/or a rigid structure such as a shaft or a rod.

Alternatively, the sliding member 106 is the nut 118 and the operation member 104 may be directly connected to and driven by the nut 118.

Referring to FIG. 4A, the power tool 100 is configured in a first operation condition in which the operation member 104 moved to a second operation position 104B, i.e. the movable blade 104 is closed. The nut 118 is moved to a position proximate or adjacent to the motor 102, thereby moves the sliding member 106 to the second sliding position 106B. As the movable blade is pivotably connected to the other fixed blade structure, the sliding member 106 may pull the movable blade to the close position via the intermediate connecting member 122 or the cable therebetween.

Optionally, the driving mechanism may further comprise a resilient member 124 arranged to restore the operation member 104 from the second operation position 104B (or the close position) to the first operation position 104A (or the open position). When the movable blade moves to the close position, the resilient member 124 such as a spring is extended. Referring to FIG. 4A, when the actuation of the power tool too is released, the driving force applied to the nut 118 and the sliding member 106 no longer exists, therefore the spring 124 may force the movable blade 104 to the open position. At the same time, the sliding member 106 is forced to move from the second sliding position 106B to the first sliding position 106A due to the restoring force of the loaded spring 124.

Alternatively, the motor 102 is further arranged to restore the operation member 104 from the second operation position 104B with a reversed motion, i.e. by rotating the screw 116 in an opposite direction so as to force the nut 118 and thus the sliding member 106 to move from the second sliding position 106B to the first sliding position 106A. However, in such configuration, the intermediate member has to be a rigid one such that the sliding member 106 may "push" the operation member 104 so as to move the movable blade to the open position.

Optionally or additionally, the power tool 100 may be provided with at least one position sensor 126 arranged to detect the sliding member 106 positioned at the first sliding position 106A and/or the second sliding position 106B. For example, the at least one position sensor 126 includes at least one electrical switch. With reference also to FIGS. 3, 4A and 4B, two electrical switches 126 may be installed in the housing 112 for detecting whether the nut 118 is adjacent to the positions of the switches 126. For example, when the nut 118 is driven to a position as shown in FIG. 4A, the first switch 126A may be actuated which indicates that the sliding is now in the first sliding position 106A. Similarly, when the nut 118 is driven to a position as shown in FIG. 4B, the second switch 126B may be actuated which indicates that the sliding is now in the second sliding position 106B. Based on different controlling mechanism, the power tool 100 may be designed to respond differently in response to the detection of the abovementioned operation states, such as to stop or slow down the driving motion of the motor 102, or to reverse the driving direction of the motor 102.

Alternatively, different number of sensors or switches may be installed to detect the sliding member 106 at the two sliding positions or different number of positions according to different design and controlling requirements.

Figure 5:
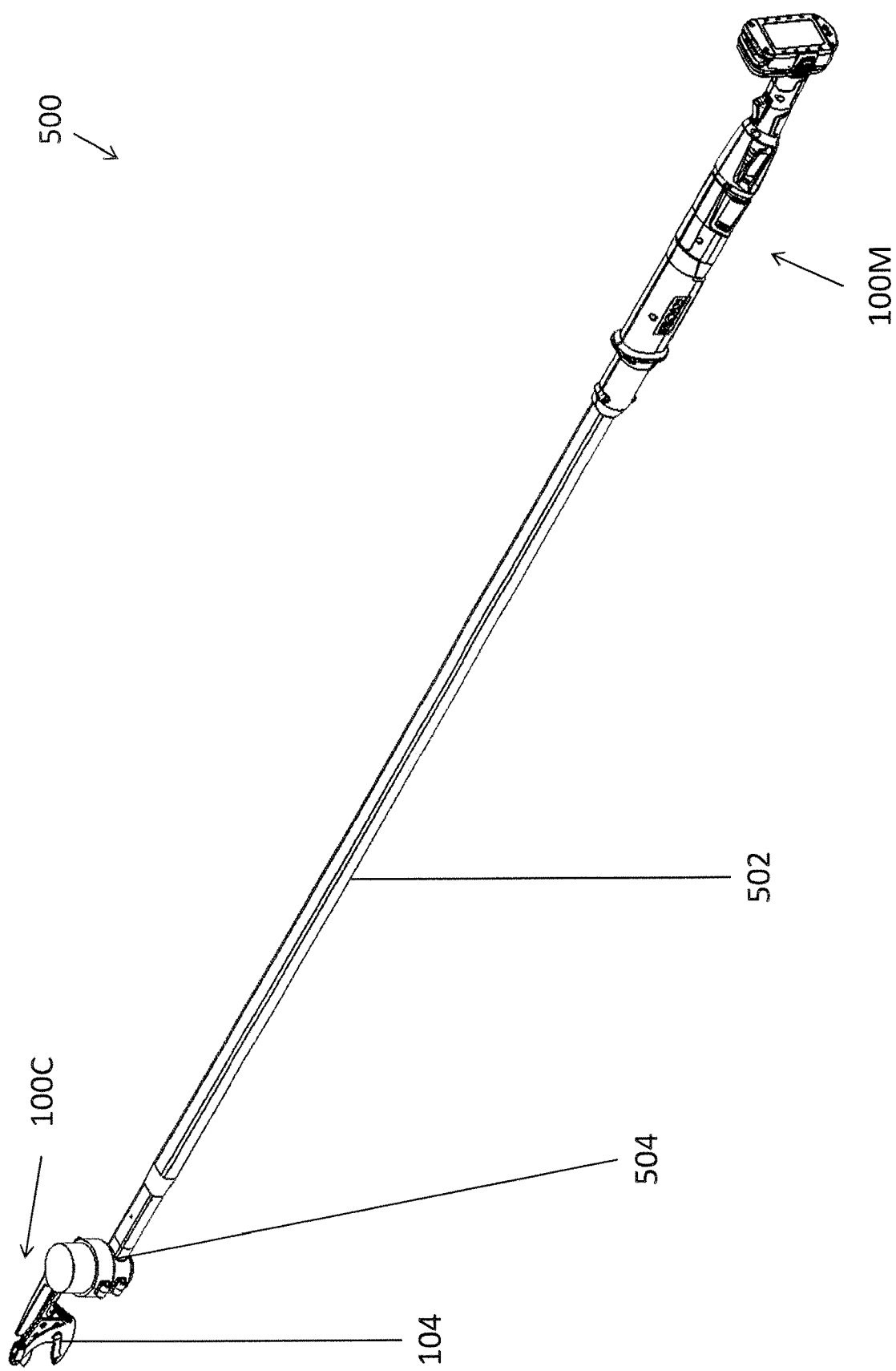
FIG. 5 is a perspective view of a power tool in accordance with one embodiment of the present invention.

With reference to FIG. 5, there is provided an alternative embodiment of the present invention. In this embodiment, the power tool 500 includes a substantially extended structure in which an extension pole/tube 502 is provided between the main body 100M and the cutting head 100C. Advantageously, a user may use such power tool 100 to cut an object which is in a distance from the position of the user.

Figure 6:
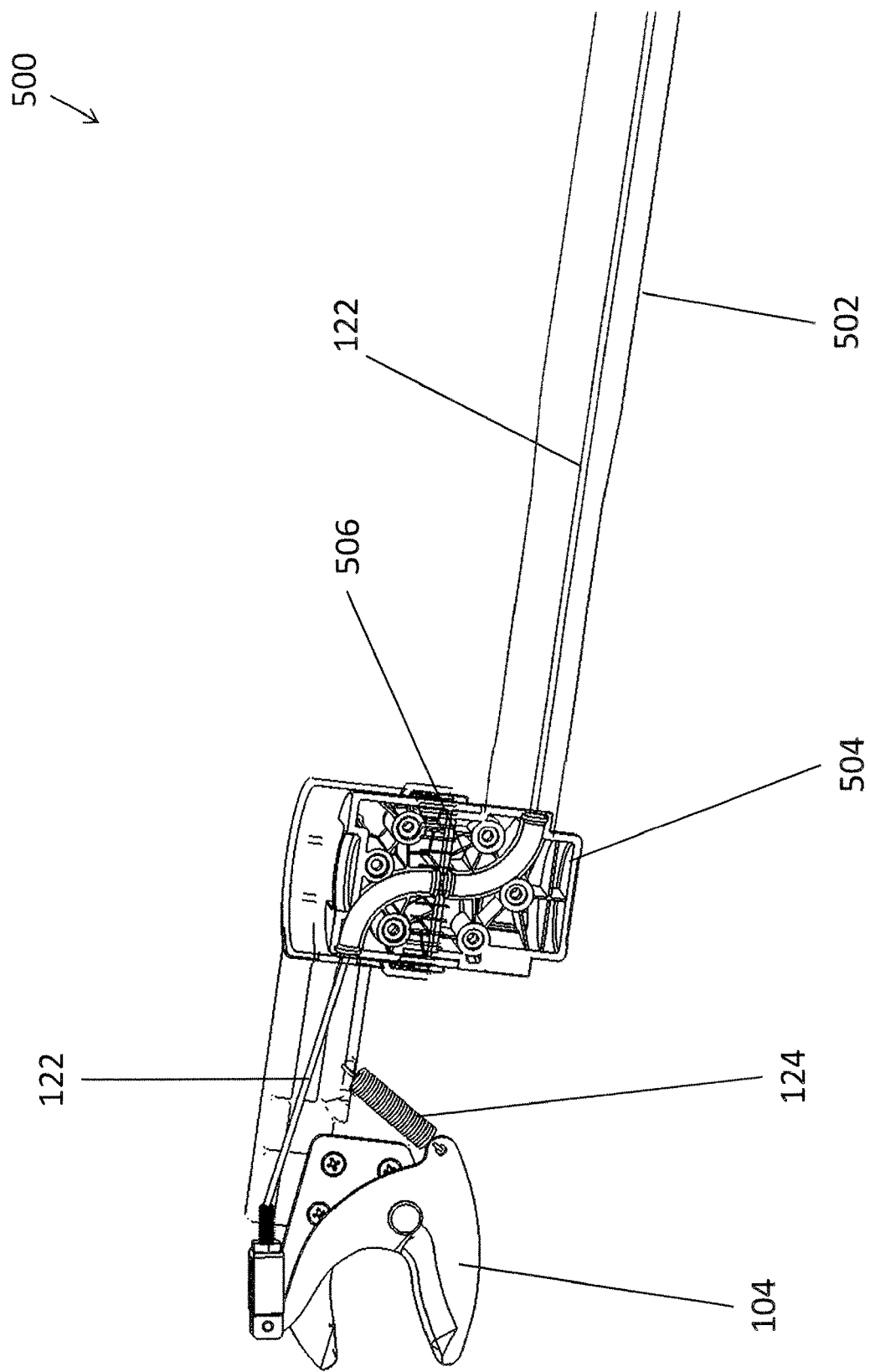
FIG. 6 is a side view of the power tool of FIG. 5, wherein the internal of the adjustable mechanism of the cutting head is exposed.
Figure 7:
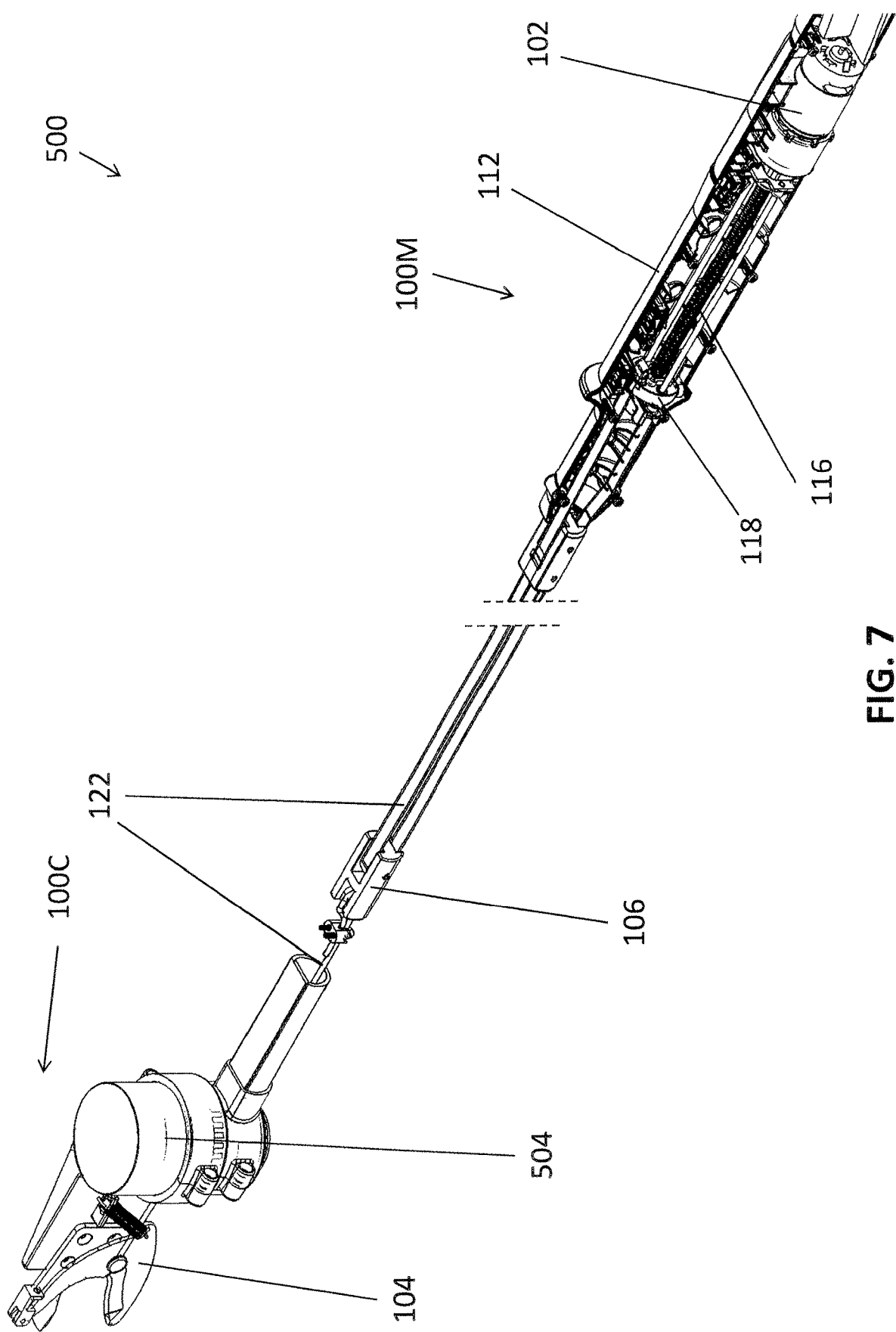
FIG. 7 is a perspective view of the power tool of FIG. 5, wherein the internal intermediate connecting members of the power tool is exposed.

With reference to FIGS. 6 and 7, an intermediate connecting member 122 such as a cable may be used to connect the operation member 104 and the sliding member 106 disposed in the main body 100M of the power tool 100. Preferably, the cable 122 runs through the internal cavity of the extension tube 502, such that the cable may be well protected from external damages.

Figure 8A:
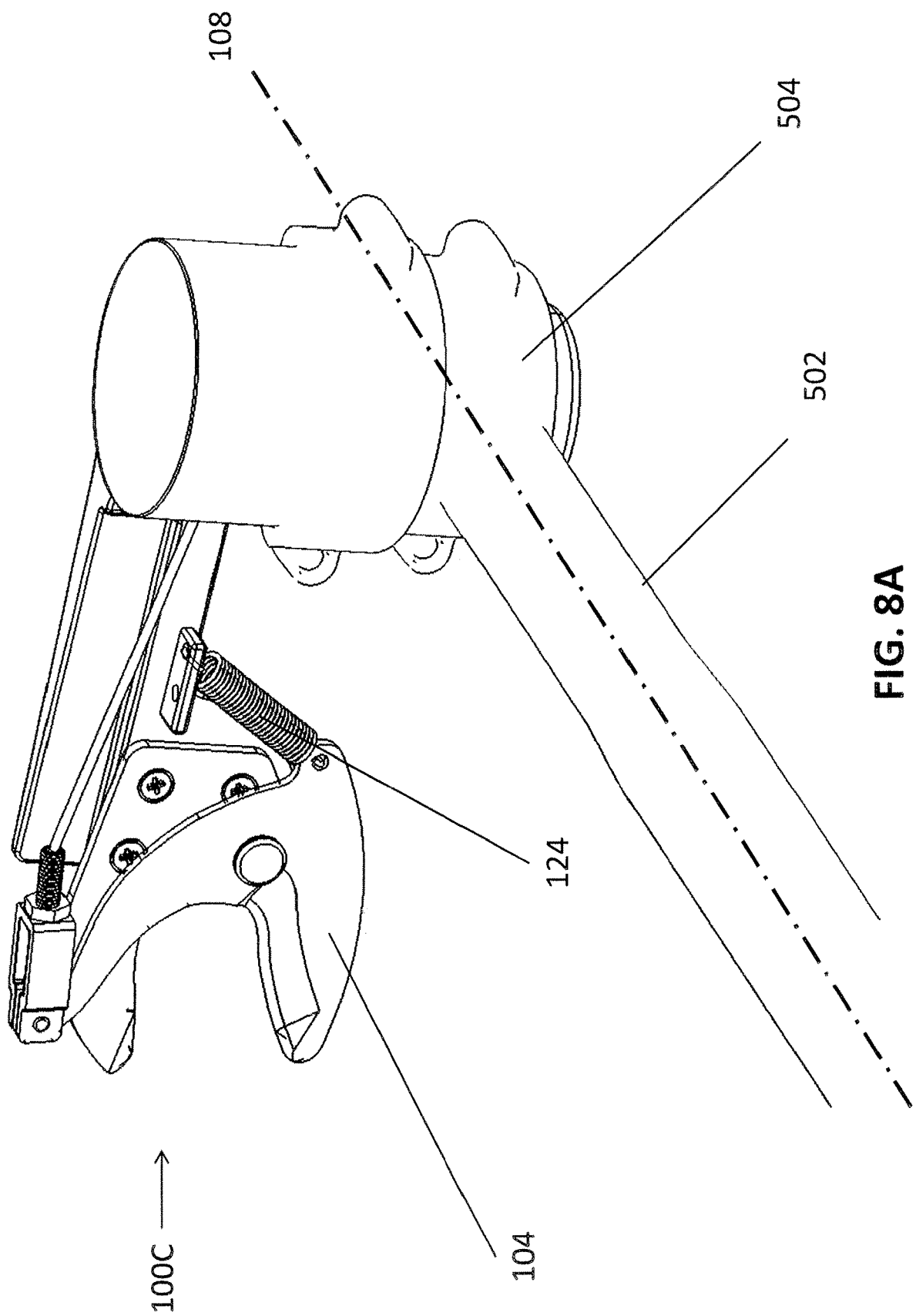
FIGS. 8A and 8B are perspective views of the power tool of FIG. 5 with the cutting head being fixed at +/−90 degrees with respect to the longitudinal axis of the power tool.
Figure 8B:
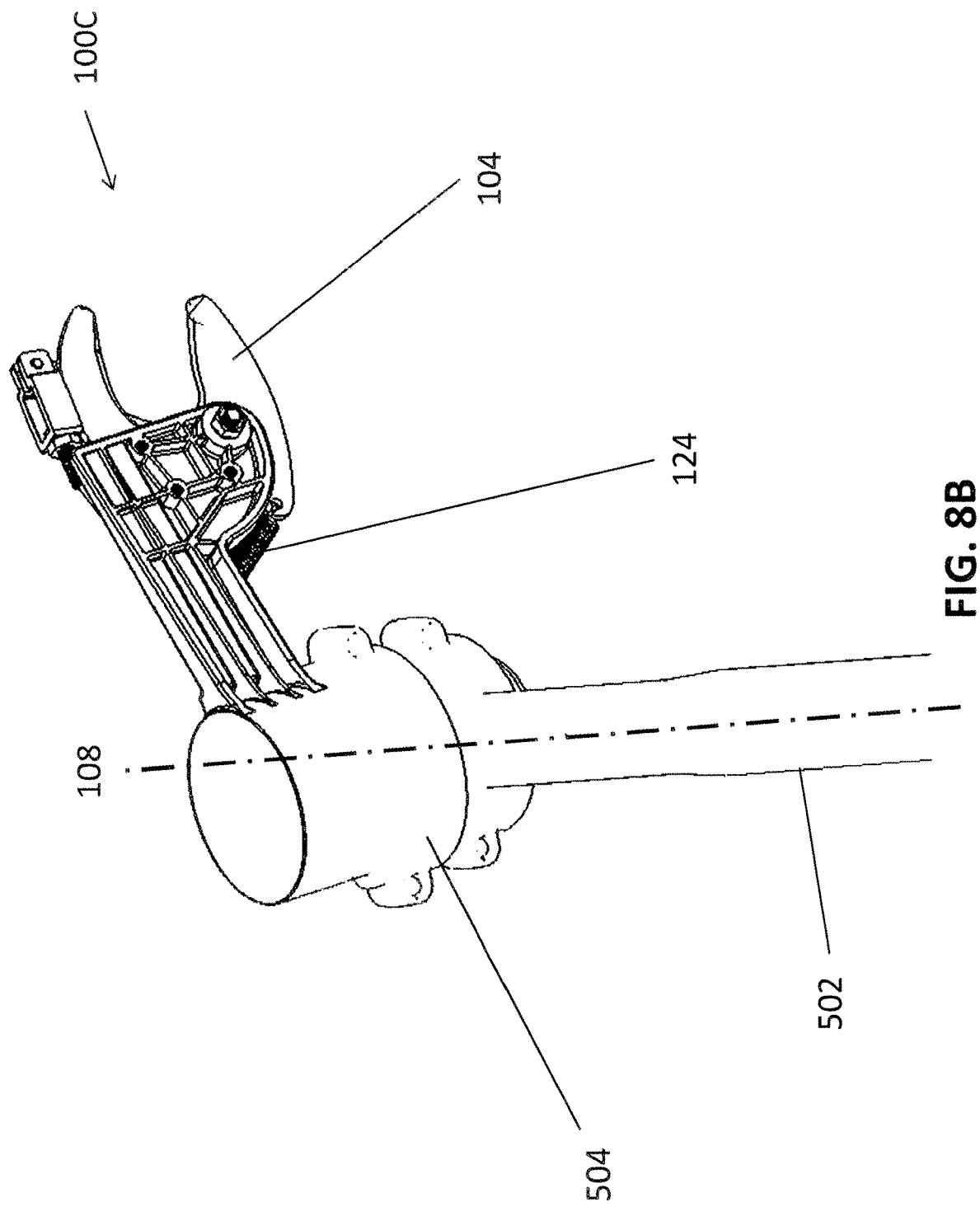

Optionally, the power tool 100 further comprises an adjustment mechanism 504 arranged to selectively fix the operation member 104 at a plurality of angles with respect to the longitudinal axis 108. Referring to also to FIGS. 8A and 8B, the cutting head 100C (or the operation member 104) may be tilted at +/−90 degrees with respect to the extension tube 504 which is substantially align with the longitudinal axis 108. For example, the adjustment mechanism 504 may be provided with a pivotable head and a locking member such that a user may selectivley fix the cutting head 100C at any desired angle, preferably between a range of +/−180 degrees with respect to the extension tube.

Preferably, the adjustment mechanism 504 may include two portions which may be pivotably coupled with each other. In addition, detent structures may be provided in the adjustment mechanism 504, which may facilitate fixing the cutting head 100C at certain selected number of angles.

Since the connection between the sliding member 106 and the operation member 104 is facilitated by the intermediate connecting member 122, and there is no substantial limitation on the length of the cable, therefore the overall length of the power tool 100 may be flexibly designed by including extension tubes with different length as desired by the user and/or the manufacturer.

In addition, the adjustment mechanism 504 may be provided with a hidden conduit 506 which allows the cable running through, therefore the entire cable 122 may be hidden from the external environment. The hidden conduit 126 includes two connected portions each provided in a respective portion of the adjustment mechanism 504, therefore the cable is hidden and substantially not affected when the cutting head is fixed in different angles.

Figure 9A:
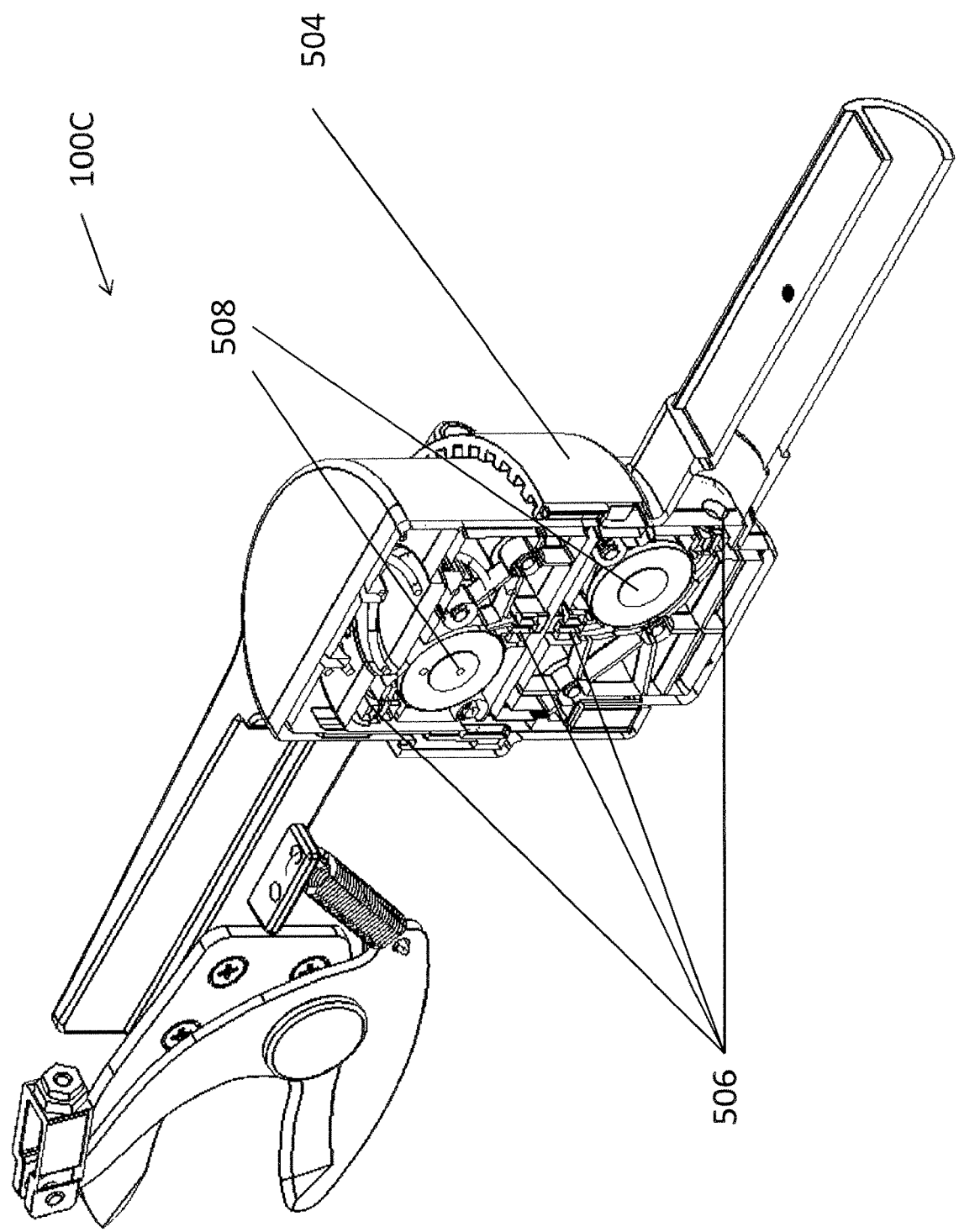
FIGS. 9A and 9B are cross-sectional views of the cutting head of the power tool in accordance with an alternative embodiment of the present invention.
Figure 9B:
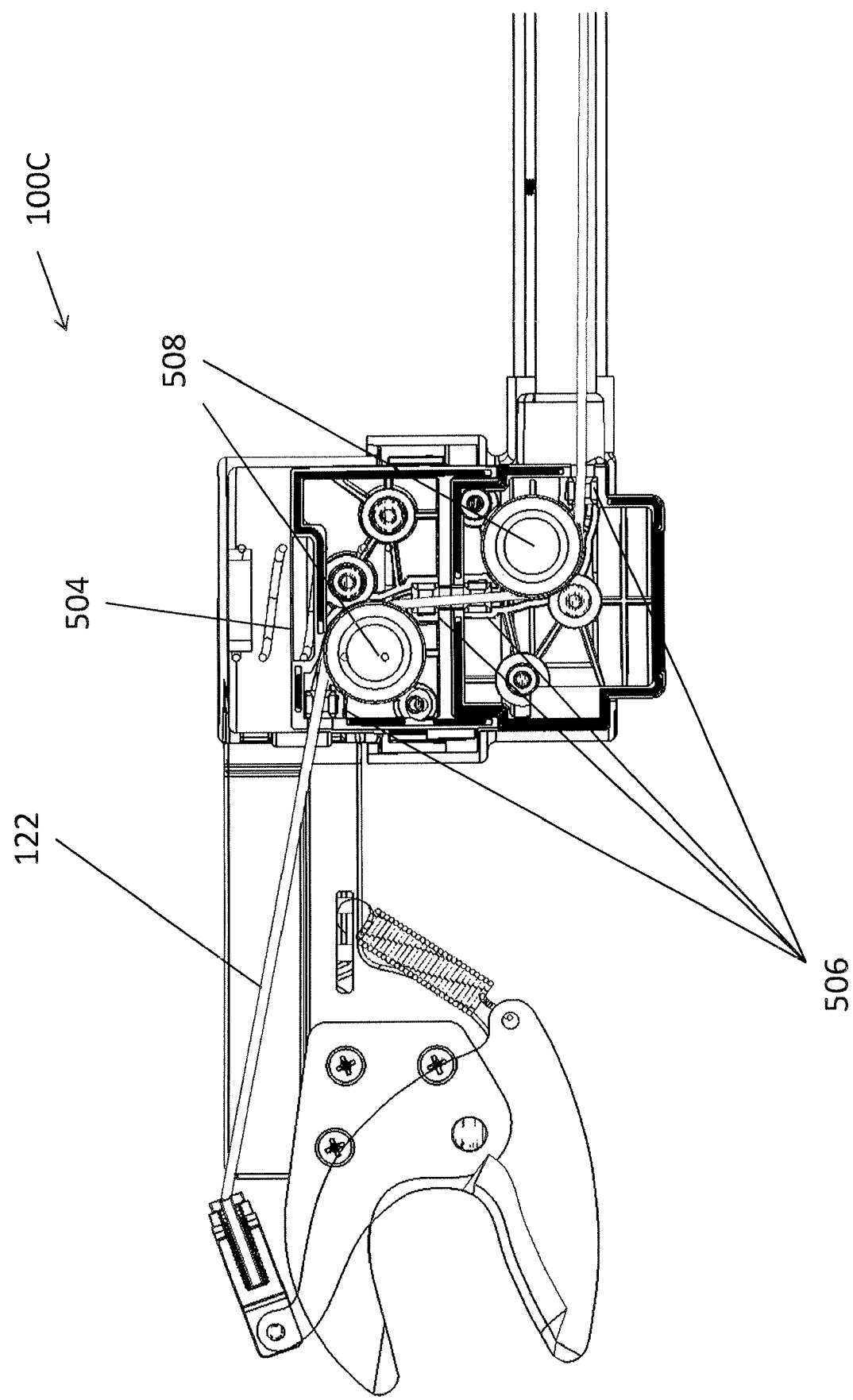

With reference to FIGS. 9A and 9B, there is provided an alternative embodiment of the cutting head 100C of the power tool 500. In this embodiment, the adjustment mechanism 504 does not include a hidden conduit for routing the cable 122, However eyelets or apertures 506 may be provided within the body of the adjustment mechanism 504 along the route of the cable 122, therefore the cable 122 may pass through the adjustment mechanism 504. As shown in the Figure, each portion is provided with two apertures 506.

In addition, in each of the two connected portions of the adjustment mechanism 504, there is provided a pulley 508 arranged to facilitate the routing and moving of the cable 122. Preferably, the pulley 508 is disposed between the two apertures 506 within each portion of the adjustment mechanism 504. The pulley 508 may be configured with a deep slot so as to make sure that the cable 122 may not come off from the pulley 508 when cutting head 100C is adjusted in different angles and/or during the operation in which the cable 122 may move back and forth. The pulleys 508 may also help reducing friction generated on the surface of the cable 122 and therefore may reduce wear on the cable 122.

Figure 10:
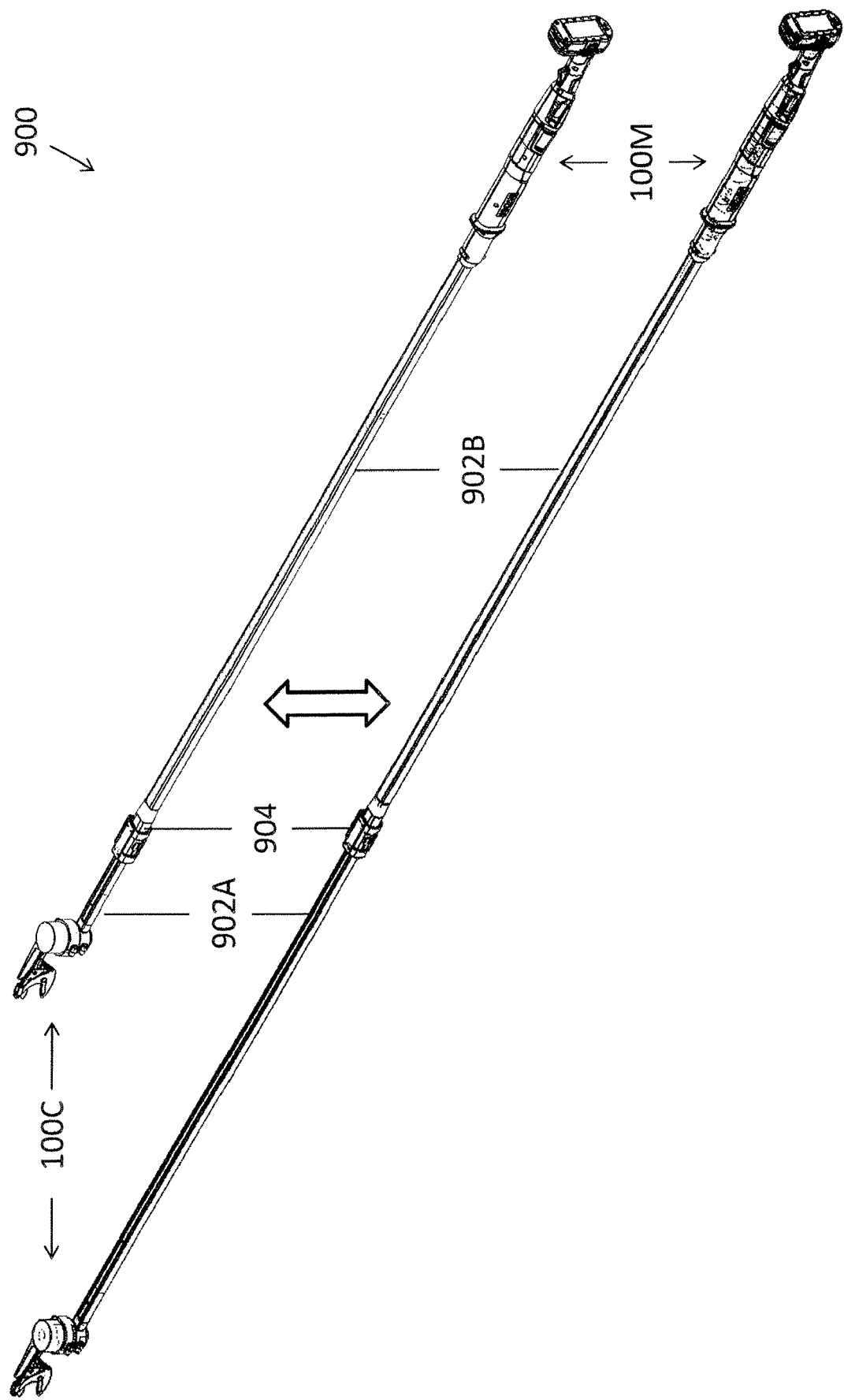
FIG. 10 is a perspective view of a power tool in accordance with one embodiment of the present invention, wherein the overall length of the power tool is adjusted differently.

With reference to FIG. 10, there is provided an alternative embodiment of the present invention. In this embodiment, the power tool 900 includes a substantially extended structure in which an extension pole/tube 902 is provided between the main body and the cutting head. In addition, the power tool 900 includes a telescopic structure. A user may adjust the overall length of the extension pole by extending or retracting the telescopic tube 902 so as to move the operation member 104 away from or towards the motor 102/the main body 100M along the longitudinal axis 108.

In this embodiment, the telescopic structure or the extension pole 902 comprises two connected portions. The cutting head 100C may be fixed to the first portion 902A of the extension pole and the main body 100M of the power tool may be fixed to the second portion 902B of the extension pole, and the two portions of the extension pole 902 may be connected with an extension locking member 904. Preferably, the first portion (or an inner tube) 902A may be partly inserted in the second portion (or an outer tube) 902B of the extension pole, and the relative position of the two portions may be releasably locked by the extension locking member 904.

Figure 11A:
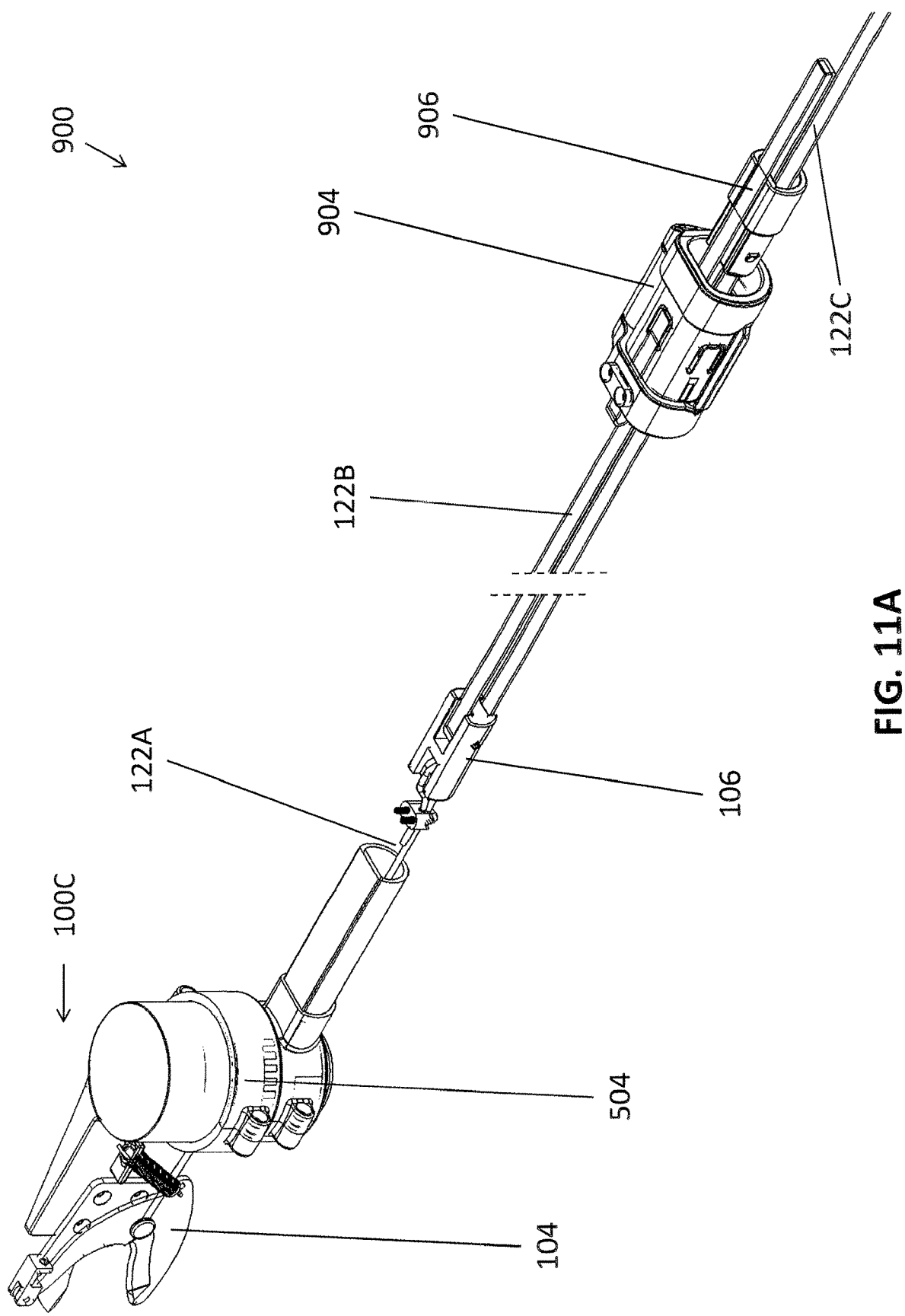
FIGS. 11A and 11B are perspective views of the power tool of FIG. 9, wherein the internal intermediate connecting members of the power tool is exposed.
Figure 11B:
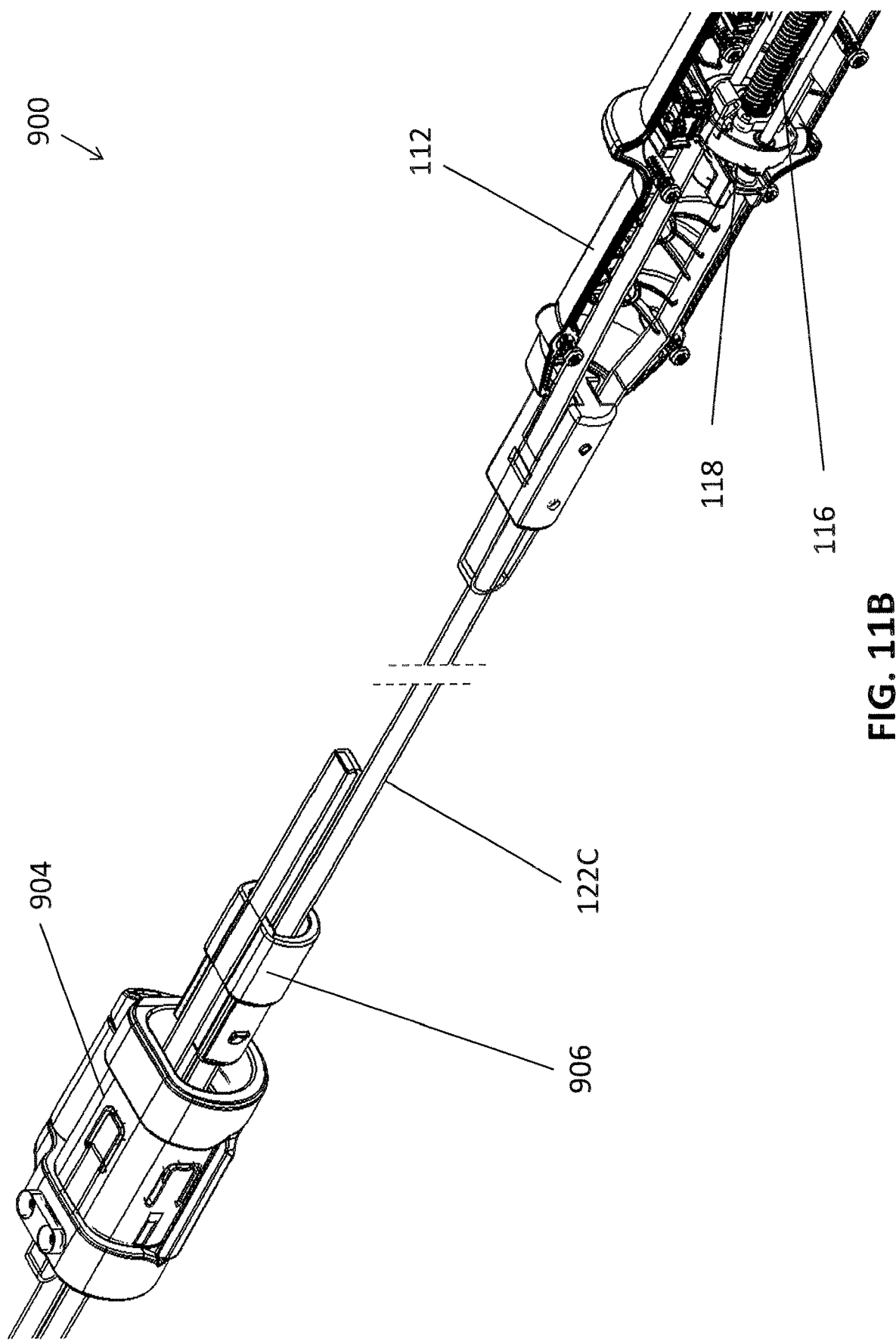

Similar to the previous embodiment, the movable blade 104, the sliding member 106 and/or the driven nut 118 may be connected through one or more cables 122 or belt. Additionally, intermediate cable fixing member 906 may be used to connect multiple cables or belts 122 between the nut 118 and the sliding member 106. Referring to FIGS. 11A and 11B, the movable blade 104 is connected to the sliding member 106 with a cable 122A, the sliding member 106 is connected to the intermediate cable fixing member 906 with a first belt 122B and the intermediate cable fixing member 906 is connected to the nut 118 through a second belt 122C. In addition, the first belt 122B may be arranged in a "folded" configuration in which an operational tension between the sliding member 106 and the intermediate cable fixing member 906 is maintained when the telescopic structure extends or retracts.

Figure 12:
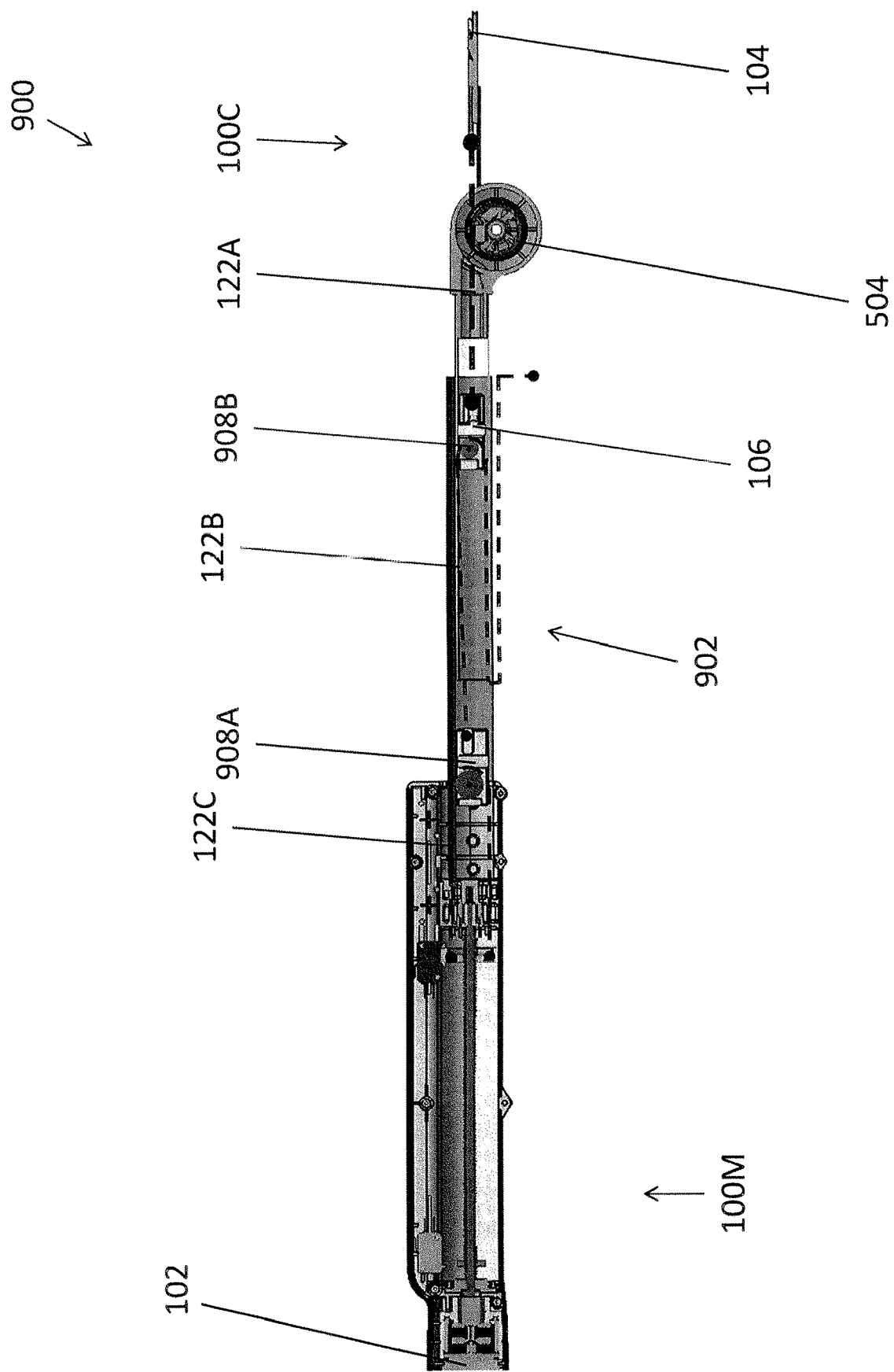
FIGS. 12 and 13 are perspective views of a power tool in accordance with one embodiment of the present invention.

Optionally, the driving mechanism may comprise at least one pulley arranged to cooperate with the at least one intermediate connecting member 122. With reference to FIG. 12, the pulley may increase a reduction ratio of the driving mechanism. For example, when the nut 118 is driven to move with a distance of d, the sliding member 106 moves with a distance of d/2 to the same direction due to the folded configuration of the belt.

Figure 13:
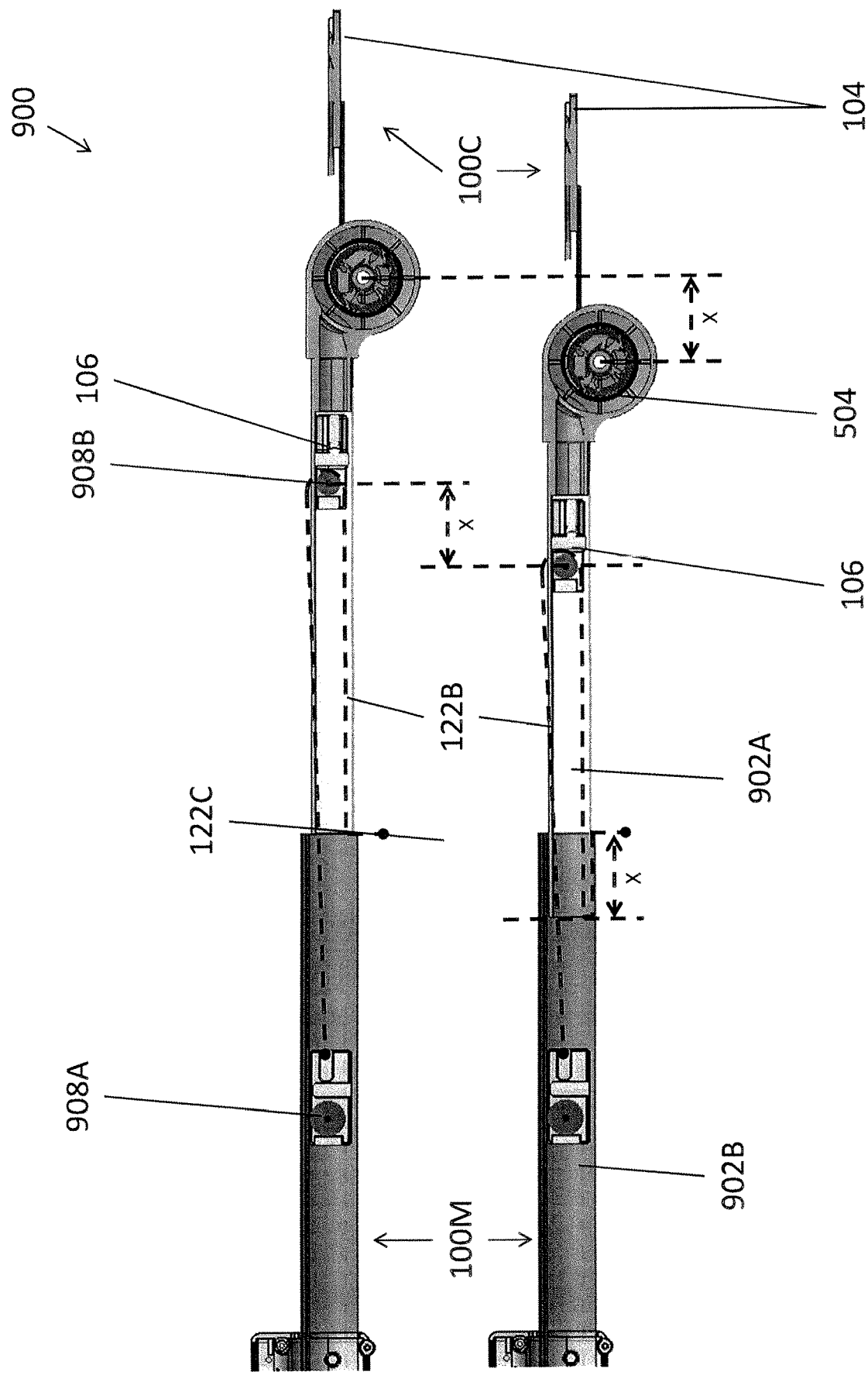

Preferably, the pulley 908 may also maintain an operational tension in the intermediate connecting member 122 when the telescopic structure extends or retracts. With reference to FIG. 13, the operation of the telescopic structure is illustrated. The belt 122B is fixedly connected to a first pulley 908A which is directly driven by the nut 118 at one end, and the other end is connected to the outer tube 902B of the telescopic pole. The belt 122B is routed through the second pulley 908B adjacent to the cutting head 100C, therefore the second pulley 908B operates as the sliding member 106. When the extension pole 902 retracts (by x as shown in the Figure), a portion of the belt 122B (of a length of x) is forced to run between the sidewalls of the inner tube 902A and the outer tube 902B near the end being fixed to the outer tube, therefore maintaining the operational tension between the pulleys 908.

Alternatively, the cables or belts 122 may be connected to simpler structures with a similar "folding" configuration but without any wheels or cable rollers so as to simply the components used in the power tool too.

These embodiments may be advantageous in that the power tool is provided with a driving mechanism which may be used in a tree lopper. The driving mechanism may be modified with different connections members such that the power tool may be adjusted to suit different operation requirements and occasions. In addition, extension tubes of different length or telescopic extensions may be included in the power tool to work with the driving mechanism without substantially changing the main body and the cutting head of the lopper.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:
1. A power tool comprising:
an operation member;
a motor arranged to drive the operation member through a driving mechanism,
the driving mechanism in connection with the motor and the operation member, wherein the driving mechanism includes a screw, a nut rotatably connected to the screw, and a sliding member is fixedly connected to the nut, the sliding member arranged to be driven by the motor to move between a first sliding position and a second sliding position along a longitudinal axis during operation of the power tool so as to drive the operation member to move between a first operation position and a second operation position;
at least one position sensor arranged to detect when the sliding member is positioned at one or both of the first sliding position and the second sliding position;
a control mechanism arranged to control the power tool to respond in response to the detected position of the sliding member;
at least one intermediate connecting member arranged to connect the sliding member to the operation member;

a telescopic structure arranged to selectively extend and retract so as to respectively move the operation member away from and toward the motor along the longitudinal axis.

2. The power tool of claim 1, wherein the control mechanism is arranged to slow down a driving motion of the motor in response to the detection.

3. The power tool of claim 1, wherein the control mechanism is arranged to stop a driving motion of the motor in response to the detection.

4. The power tool of claim 1, wherein the control mechanism is arranged to reverse a driving direction of the motor in response to the detection.

5. The power tool of claim 1, wherein the screw is arranged to rotate with respect to a rotational axis parallel to the longitudinal axis so as to drive the nut to move along the longitudinal axis.

6. The power tool of claim 1, wherein the at least one position sensor includes:
   a first position sensor arranged to detect the sliding member positioned at the first sliding position, the first position sensor is a first electrical switch arranged to be actuated by the nut when the sliding member is positioned at the first sliding position; and
   a second position sensor arranged to detect the sliding member positioned at the second sliding position, the second position sensor is a second electrical switch arranged to be actuated by the nut when the sliding member is positioned at the second sliding position.

7. The power tool of claim 1, wherein the motor is arranged to drive the screw so as the drive the sliding member to move between the first sliding position and the second sliding position.

8. The power tool of claim 1, wherein the at least one intermediate connecting member include at least one of: a string, a rope, a strand, a chain, a belt, and a cable.

9. The power tool of claim 8, further comprising:
   at least one pulley arranged to cooperate with the at least one intermediate connecting member.

10. The power tool of claim 9, wherein the at least one pulley is arranged to increase a reduction ratio of the driving mechanism.

11. The power tool of claim 1, wherein the at least one pulley is arranged to maintain an operational tension of the intermediate connecting member when the telescopic structure extends or retracts.

12. The power tool of claim 1, wherein the driving mechanism further comprises a resilient member arranged to provide a restoring force to restore the operation member from the second operation position to the first operation position.

13. The power tool of claim 1, further comprising an adjustment mechanism arranged to selectively fix the operation member at a plurality of angles with respect to the longitudinal axis.

14. The power tool of claim 1, wherein the operation member includes a movable blade arranged to move between an open position, which corresponds to the first operation position, and a close position, which corresponds to the second operation position.

15. The power tool of claim 1, wherein the power tool is a pruner or a lopper.

16. The power tool of claim 1, wherein the power tool is battery-powered.

17. The power tool of claim 1, wherein the power tool includes a gripping portion at a proximal end, and the operation member is arranged at a distal end, wherein the gripping portion includes a cavity for insertion of a portion of a battery assembly.

* * * * *